United States Patent
Mandiganal et al.

(10) Patent No.: US 9,386,552 B2
(45) Date of Patent: Jul. 5, 2016

(54) WIRELESS SENSOR TIME SYNCHRONIZATION

(71) Applicant: Honeywell International Inc., Morristown, NJ (US)

(72) Inventors: Santosh Mallikarjuna Mandiganal, Karnataka (IN); Rachana Gurunandan Rao, Karnataka (IN); Patrick S. Gonia, Maplewood, MN (US); Vincent Clarence Jacobson, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 130 days.

(21) Appl. No.: 14/041,956

(22) Filed: Sep. 30, 2013

(65) Prior Publication Data

US 2015/0092640 A1 Apr. 2, 2015

(51) Int. Cl.
*H04W 56/00* (2009.01)
*H04W 52/02* (2009.01)
*H04W 4/22* (2009.01)

(52) U.S. Cl.
CPC ........... *H04W 56/0015* (2013.01); *H04W 4/22* (2013.01); *H04W 52/02* (2013.01); *H04W 52/029* (2013.01)

(58) Field of Classification Search
CPC .................. H04W 76/048; H04W 56/0035
See application file for complete search history.

(56) References Cited

U.S. PATENT DOCUMENTS

| | | | |
|---|---|---|---|
| 6,212,398 B1 * | 4/2001 | Roberts et al. | 455/502 |
| 2003/0117991 A1 * | 6/2003 | Beyer et al. | 370/349 |
| 2010/0238990 A1 * | 9/2010 | Rao | 375/228 |
| 2011/0080985 A1 * | 4/2011 | Secker et al. | 375/376 |
| 2012/0163352 A1 * | 6/2012 | Bansal et al. | 370/338 |
| 2013/0227172 A1 * | 8/2013 | Zheng et al. | 709/248 |

FOREIGN PATENT DOCUMENTS

| | | |
|---|---|---|
| EP | 0726687 A1 | 8/1996 |
| EP | 1135944 A1 | 9/2001 |
| GB | 2491001 A | 11/2012 |

OTHER PUBLICATIONS

"European Application Serial No. 14184692.3, Extended European Search Report mailed Feb. 12, 2015", 7 pgs.

* cited by examiner

*Primary Examiner* — John Blanton
(74) *Attorney, Agent, or Firm* — Schwegman Lundberg & Woessner, P.A.

(57) ABSTRACT

A method including running a local low frequency clock in a node in a network during a battery conserving sleep mode, waking from the sleep mode at a time boundary determined by the low frequency clock, updating a representation of a master time based on a calculation and the time boundary, advancing the representation of master time based on a local high frequency clock while the node is awake, receiving a time synchronization signal from a node in the network, updating the calculation based on a difference between the representation of master time and a time provided in the time synchronization signal, setting a new time boundary, and returning to the sleep mode.

20 Claims, 5 Drawing Sheets

WIRELESS SENSOR TIME SYNCHRONIZATION

BACKGROUND

Accurate time synchronization is one of the critical requirements of a wireless network. For wireless fire sensor networks, time synchronization affects important factors governing network performance like fire regulatory latency requirements, interference and power consumption. The nodes in the network have to be tightly synchronized so that they transmit and receive data at designated times without interference with each other.

Actuators such as light strobes within a fire network may also have to be synchronized so that in case of a fire alarm, they can be periodically activated at precise times. Also, since wireless sensor nodes are battery powered, they should be energy efficient, remaining in power save mode most of the time and waking up only to exchange information. Designing a time synchronization mechanism that ensures reliable communication within regulatory limits and also optimizes power consumption is a big challenge.

SUMMARY

A method including running a local low frequency clock in a node in a network during a battery conserving sleep mode, waking from the sleep mode at a time boundary determined by the low frequency clock, updating a representation of a master time based on a calculation and the time boundary, advancing the representation of master time based on a local high frequency clock while the node is awake, receiving a time synchronization signal from a node in the network, updating the calculation based on a difference between the representation of master time and a time provided in the time synchronization signal, setting a new time boundary, and returning to the sleep mode.

In a further embodiment, the method may be embodied in computer executable code stored on a computer readable storage device.

A system includes a local high frequency clock, a local low frequency clock, a receiver to receive a time synchronization signal from a node in the network, and a controller coupled to the local high frequency clock, the low frequency clock, and the receiver to wake the system responsive to a time boundary determined by the low frequency clock, update a representation of master time based on a calculation and the time boundary, advance the representation of master time based on the local high frequency clock while the system is awake, receive a time synchronization signal from a node in the network, and update the calculation based on a difference between the representation of master time and a time provided in the time synchronization signal.

DETAILED DESCRIPTION

Figure 1:
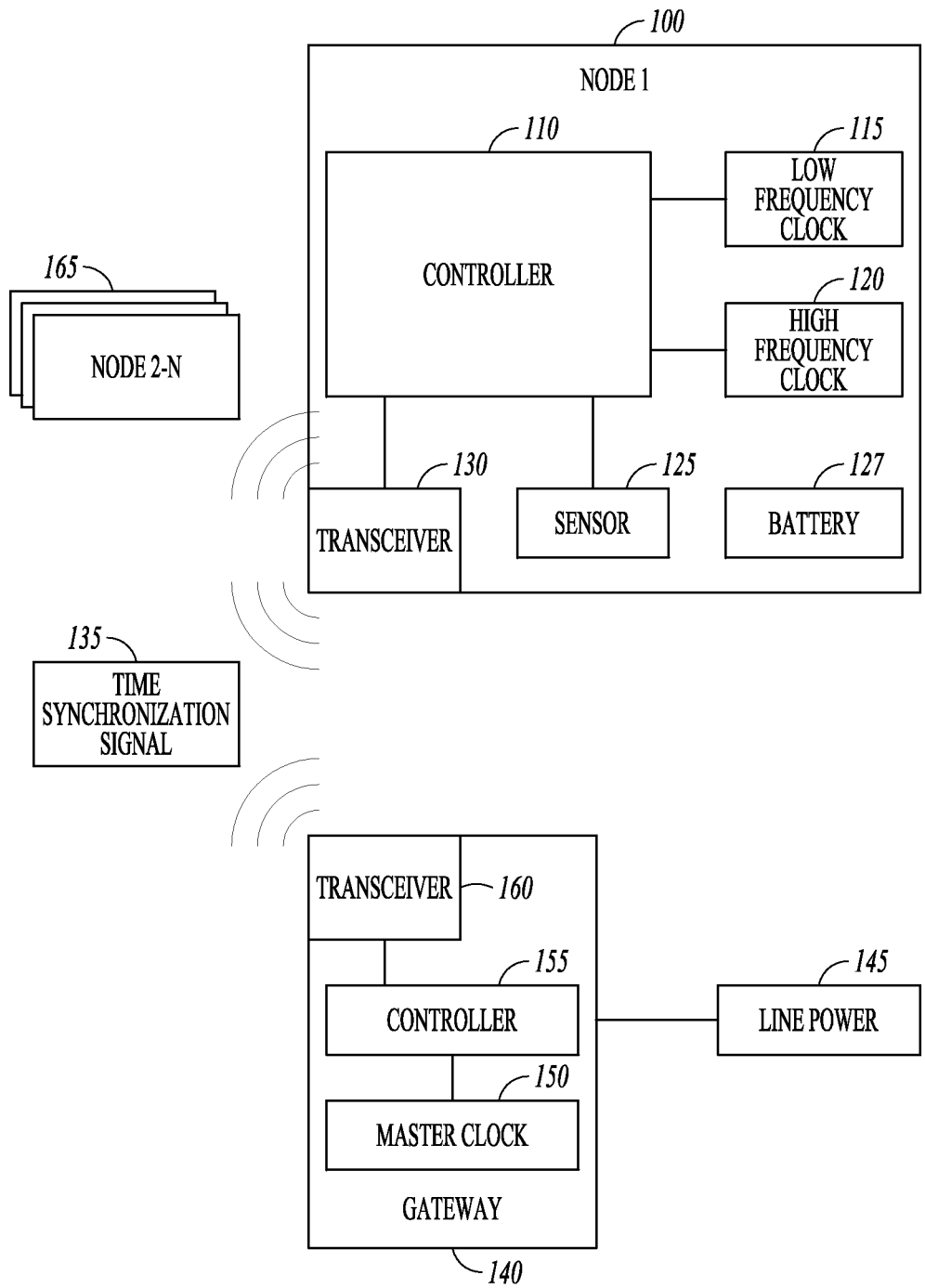
FIG. 1 is a block diagram of a portion of a wireless sensor time synchronization network according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Various embodiments relate generally to monitoring and alarm systems. Some embodiments relate to wireless fire detection systems and voice annunciation (VA) and public annunciation (PA) systems. A time synchronization mechanism provides both high time-sync accuracy and power optimization in fire sensor networks. The mechanism achieves accuracy by exchange of time stamps based on a first, high frequency clock and history-based drift compensation between parent and child nodes in the network. To achieve low power consumption, a second, low frequency and in one embodiment, less accurate, clock stays awake in the child nodes during sleep intervals to maintain the time. The less accurate clock may consume less power than a high frequency clock in one embodiment, and thus helps to conserve battery life in a sleep type of mode.

When the nodes wake up, the high frequency clock is first appropriately updated to represent the master time based on the value of the low accuracy clock. In addition the representation of master time in the high frequency clock is synchronized to the master time through exchange of time synchronization messages. Therefore there are two synchronization methods involved. One method updates the representation of master time in the high frequency clock with respect to the low accuracy clock at every wakeup from power save mode (sleep). In the second synchronization method, the representation of master time in the high frequency clock is synchronized to its parent's representation of master time based on the time-stamp received. To propagate the time each node may then sends its own time synchronization timestamp to its child. The child node receives time synchronization messages from its parent at regular intervals. These time synchronization messages contain the parent time-stamp and are used to synchronize the child representation of master time to the parent representation of master time. The child also maintains a history of parent time-stamps which it uses to correct drift, especially in case of a time synchronization packet loss. MAC level time-stamping may be used to further ensure accuracy for the timestamps.

FIG. 1 is a block diagram of a wireless node 100, which may be a wireless fire sensor node in one embodiment, an audio alert providing node, or any other type of node in further embodiments. Node 100 includes a controller 110 coupled to a low frequency clock 115, and a highly frequency clock 120. The low accuracy clock 115 in one embodiment runs at a slower speed, such as in the KHz range to consume less power, but with low resolution. One such clock operates with a 32 KHz crystal. The highly accurate clock 120 may run in the MHz range or higher, using for example, a 44 MHz crystal providing a higher resolution, but also consuming more power.

In some embodiments, the controller 110 is coupled to a sensor 125, such as a fire detection sensor. A battery 127 may be used to power the wireless node 100. Controller 110 is also coupled to a transceiver 130 to transmit and receive signals to and from other nodes. In one embodiment, transceiver 130 operates as a receiver to wirelessly receive a time synchronization signal 135 periodically transmitted from gateway 140 or from other nodes 100 if the gateway is not in range. In one example, the gateway may transmit a beacon frame containing a 64 bit timestamp referred to as an IEEE 802.11 TSF (time synchronization function) to synchronize child nodes in a network using a time division multiple access (TDMA) protocol with allocated time slots. The time synchronization signal 135 may take other forms that may be inconsistent with the IEEE 802.11 TSF format.

Controller 110 is coupled to the high frequency clock 120, the low frequency clock 115, and the transceiver to wake the node responsive to a wakeup count based on the low frequency clock 115 and to start the highly frequency clock 120 and synchronize the highly frequency clock 120 as a function of the received time synchronization signal 135. In one embodiment, the controller is programmed to perform history based drift compensation as a function of the low frequency clock 115 and received time synchronization signals 135. In a further embodiment, the controller 110 synchronizes the highly frequency clock 120 as a function of receive path delay. The time synchronization signal 135 in one embodiment may have an accuracy of 10 μs or less. Waking from the sleep mode may be based on a count derived from the low frequency clock 115.

Gateway node 140 in one embodiment may be a line powered 145 parent node in a wireless mesh network. The gateway 140 may include a master clock 150, a controller 155, and transceiver 160. The master clock continues to run during sleep modes of child nodes, such as node 100 and other nodes indicated at 165 in the network. The master clock is the primary source of time that all other nodes 100 and 165 may attempt to emulate in their local representation of master time. The other nodes may be child nodes of node 100, which acts to propagate a time synchronization signal to its child nodes after node 100 has been synchronized, or the other nodes 165 may be child nodes of parent node access point 140, and receive the same time synchronization signal 135 as node 100. In further networks, the child nodes 165 may themselves act as parent nodes, sending time synchronization signals 135 to their child nodes once they are updated with a representation of master time. Basically, each node has its own sense of local time (a representation of master time) which is updated via propagating time synchronization signals originating from a master clock residing in the gateway 140.

Figure 2A:
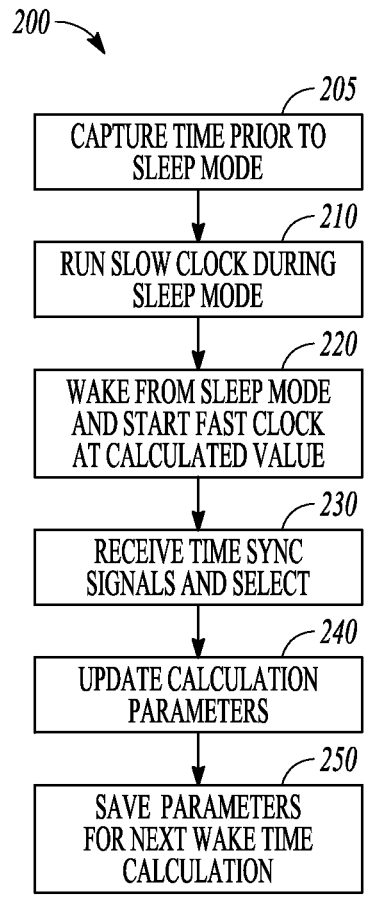
FIG. 2A is flowchart illustrating a method of synchronizing a highly accurate clock when waking from a sleep mode according to an example embodiment.

FIG. 2A is a flowchart illustrating a method 200 of synchronizing a highly accurate clock of a fire sensor node according to an example embodiment. Method 200 may include capturing a time prior to entering a sleep mode at 205 and then running a low accuracy clock 210 in a child node in a wireless fire sensor network to keep track of time during a battery conserving sleep mode. In one embodiment, capturing a time includes receiving a time synchronization signal from a parent node at 205 prior to entering a deep sleep or powered-down mode. Obtaining the time synchronization signal prior to entering the sleep mode may be useful in determining a history of drift to better compensate when waking up. At 220, the node is waked from the sleep mode and the highly accurate clock may be restarted and set to the computed value to represent the master time. At 230, a time synchronization signal is received from a parent node in the wireless fire sensor network. At 240, parameters for a time correction calculation are updated for use in the subsequent occurrence of 220 following waking from a sleep mode. At 240a history based drift compensation may be performed to correct the time. At 250 the calculation parameters are saved in a memory that is retained during sleep such that the parameters can be used at the next wake (220).

In one embodiment, the history based drift compensation comprises a rate multiplier that is derived from an integral derivative control function performed on past differences between the local representation of master time and the received time synchronization signals.

The wireless network may be a multi hop wireless network where each child node receives a time synchronization signal from its parent node propagated from the time synchronization signal of the master gateway clock. The nodes may then pass a time synchronization signal to further child nodes based on its updated local representation of master time.

Figure 2B:
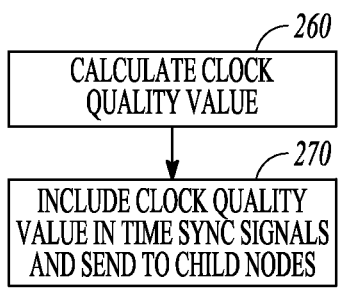
FIG. 2B is a flowchart illustrating a method of calculating a clock quality value and including it in time synchronization signals passed to child nodes according to an example embodiment.

In one embodiment, the nodes calculate a clock quality value at 260 as illustrated in a flowchart in FIG. 2B, indicating a confidence level in the quality of their clocks. This may be a measure of absolute time quality having a range of 0 to 255 in one embodiment represented by an additional 8 bits, and may be based on latency delays from the master clock signal and may also be based on the number of hops through intermediate nodes prior to receiving a time synchronization signal. The clock quality value may be included with the time synchronization signal that is passed on to child nodes at 270. The time synchronization signal sent by the gateway node may carry the highest quality value as it is the master clock for the entire system.

In a further embodiment, multiple time synchronization signals are received from different nodes at 230. The receiving node may then select one of the received time synchronization signals to use to update the representation of master time as a function the clock quality values of the received time synchronization signals.

In one embodiment, waking from the sleep mode at 220 is performed at a time determined from the low accuracy clock in the child node. Waking from the sleep mode is based on a count derived from the low accuracy clock. Waking from the sleep mode further comprises updating the representation of master time time based on the low accuracy clock.

The received time synchronization signal may be based on a master clock that stays operative during the sleep mode of the child node. The high frequency clock in the child node is not running during the sleep mode of the child node to conserve batter power. In one embodiment, a TDMA protocol is implemented to receive the time synchronization signals in accordance with child allocated time slots. The child node may update the time as a function of receive path delay. The time synchronization signal may have an accuracy of 10 μs or less.

Figure 3:
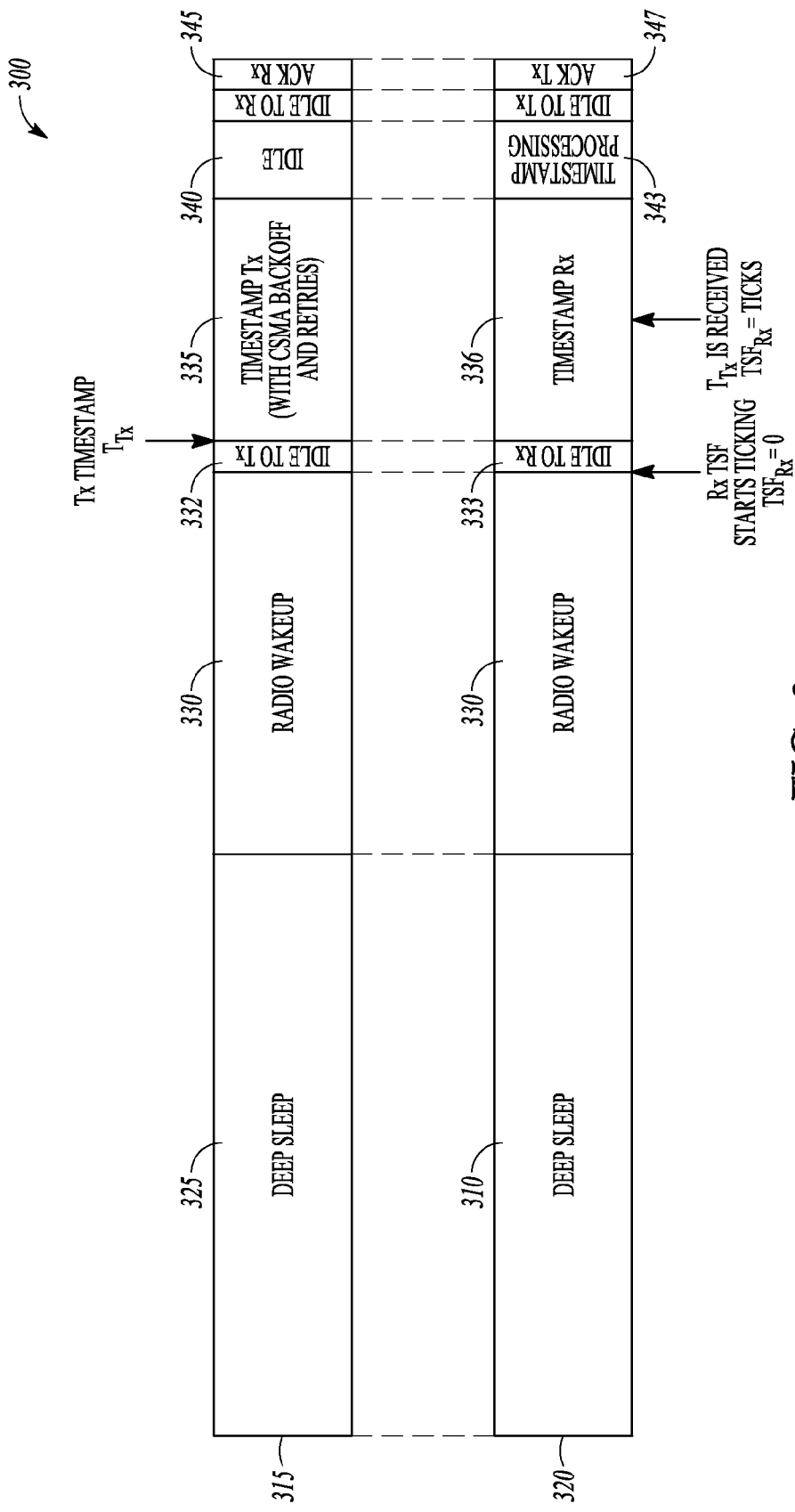
FIG. 3 is a timing diagram illustrating the timing of waking a node waking from a deep sleep according to an example embodiment.

FIG. 3 is a timing diagram 300 illustrating the timing of waking a node from a deep sleep 310. Two timings are shown. A transmit timing sequence is illustrated at 315, corresponding to a parent node or transmit node, and a receive timing sequence is shown at 320, corresponding to a child node or receive node. The parent node may also be in a sleep mode 325, utilizing a highly accurate clock, also referred to as a time synchronization function (TSF) timer to both put the node into an optional sleep mode and wake it up at the appropriate time to be able to provide an accurate synchronization signal to its child nodes. In some embodiments, the parent node obtains a beacon from an access point to accurately maintain its TSF timer.

At 330, the nodes wake their transceivers, also referred to as radio wakeup. Following radio wakeup, idle times for transmit at 332 and receive at 333 occur. In one embodiment, at the beginning of idle time for receive 333, the TSF starts ticking, at 0. At the end of the idle times, the parent node transmits the timestamp as indicated at 335 as a time sync super frame, and it is received by the child at 336. The parent is then idle at 340, while the child performs timestamp processing at 343. Following a further idle time, the parent requests an acknowledgement of receipt of the timestamp at 345, and the child acknowledges at 347.

In one embodiment, the time, $TSF_{TX}$=ticks+time2ticks $(T_{TX})$−time2ticks(Idle to Rx time), wherein time2ticks is an application programming interface to convert ms to ticks, and Idle to Rx time is a constant. The parent node may then propagate the correct time to its child nodes, which may in turn do the same to ensure all nodes in a mesh have the same time. In one embodiment, the child nodes have low level access to a Wi-Fi stack to replace beacon functionality with the time sync frames, and also have read and write access to TSF timers and power save mode control via a controller.

Figure 4:
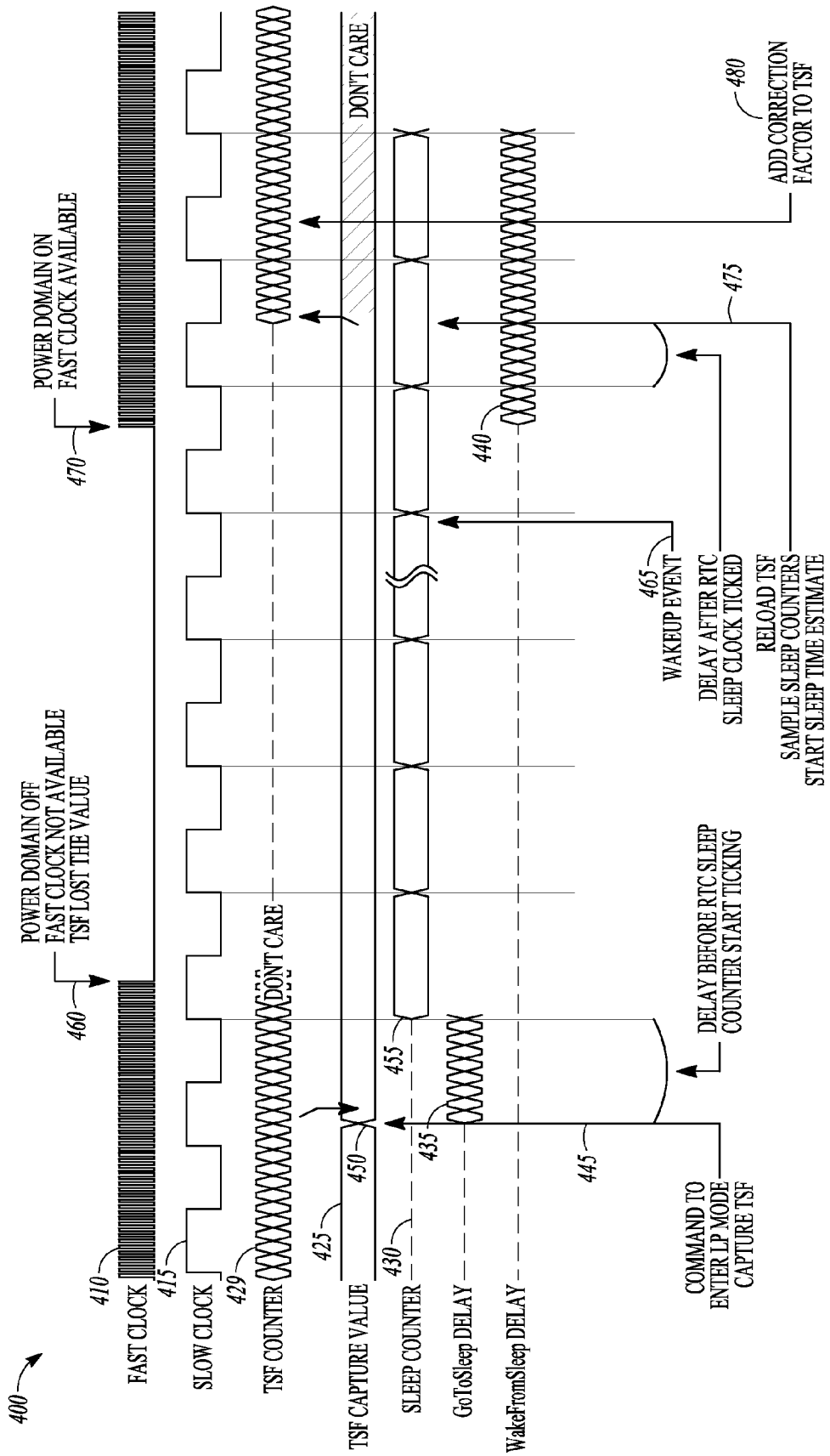
FIG. 4 is a timing diagram 400 illustrating time persistence during power save modes of a node according to an example embodiment.

FIG. 4 is a timing diagram 400 illustrating time persistence during power save modes of a node according to an example embodiment. Multiple time lines are shown, including a high frequency clock 410, low frequency clock 415, representation of master time (TSF) counter 429, TSF captured value 425, sleep counter 430, goto sleep delay 435 and wakefromsleep delay 440. While the child node is awake, the high frequency clock and the low frequency clock are both operative as illustrated at 410 and 415. Similarly, the TSF counter 420 is also active and incrementing based on the high frequency clock. At 445, a command to enter a sleep mode is received, and a pre-sleep TSF value may be captured at 450. After that point, the TSF is still shown as incrementing for a short period of time, but may not be used. A delay at 435 is shown before the sleep counter 430 starts counting at 455. At 460, the node is powered down, along with the high frequency clock 410. Note that the low accuracy clock 420 continues to run, being used to increment the sleep counter 430.

As the end of a sleep cycle, a wakeup event occurs as indicated at a time 465. The wakeup event may be generated based on the sleep counter reaching a specified value, or from an external event in various embodiments. At 470, the node is powered on and the high frequency clock begins operating. The wake from sleep delay 440 starts counting based on the high frequency clock as indicated at 440, and after a delay, the representation of master time is reloaded at 475 based on the sleep counter estimation of sleep time. A correction factor is added at 480. The TSF counter 420 then continues to increment.

At an application level, a sync mechanism which may be run in the controller 110 ensures that audio and visual actuators of sensor 125 are synchronized to within 20 ms during a fire alarm. This may be done in a few different ways using the representation of master time as a time base for the system clock. In one embodiment, a mechanism is used to propagate the representation of master time (TSF) time to the application level periodically.

Figure 5:
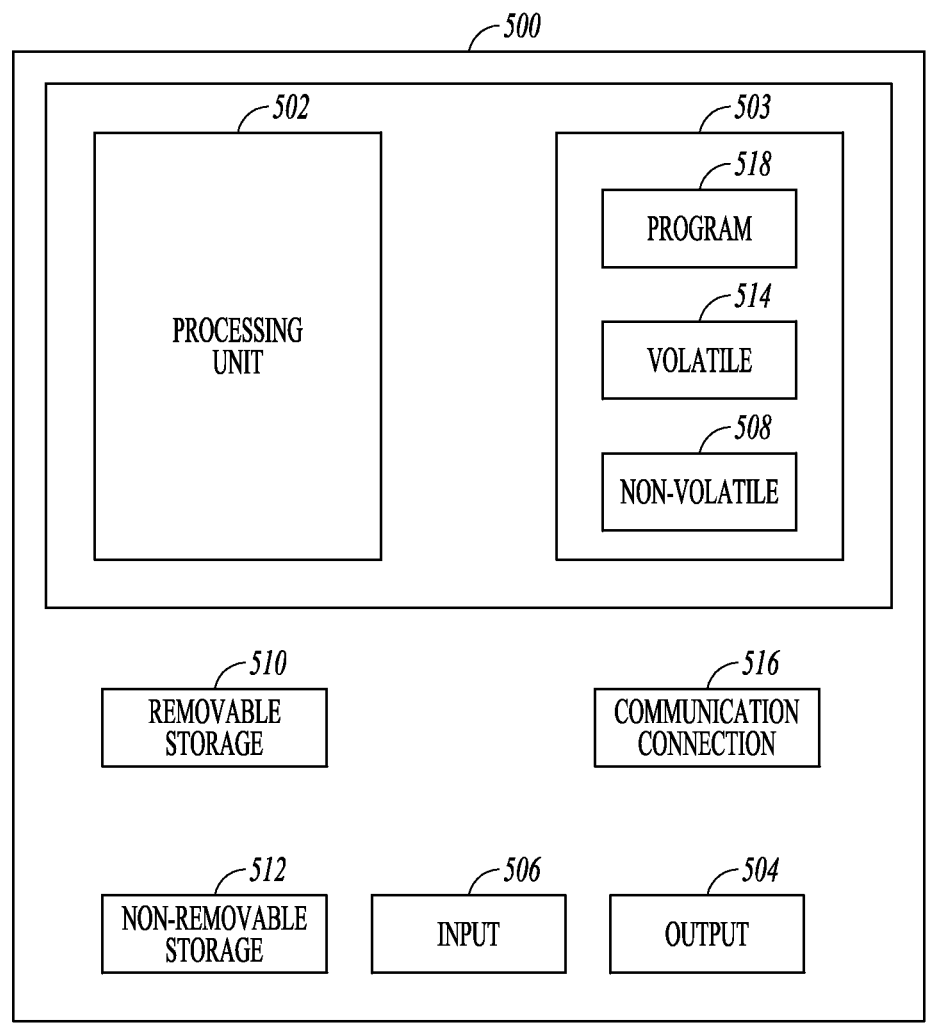
FIG. 5 is a block diagram of a computer system for implementing one or more example embodiments.

FIG. 5 is a block schematic diagram of a computer system 500 to implement one or more example embodiments. A controller language or an object-oriented, service-oriented, or other architecture may be used to implement such functions and communicate between the multiple systems and components. One example computing device in the form of a computer 500, may include a processing unit 502, memory 503, removable storage 510, and non-removable storage 512. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

EXAMPLES

1. A method comprising:
running a local low frequency clock in a node in a network during a battery conserving sleep mode;
waking from the sleep mode at a time boundary determined by the low frequency clock;
updating a representation of a master time based on a calculation and the time boundary;

advancing the representation of master time based on a local high frequency clock while the node is awake;

receiving a time synchronization signal from a node in the network;

updating the calculation based on a difference between the representation of master time and a time provided in the time synchronization signal;

setting a new time boundary;

returning to the sleep mode.

2. The method of example 1 and further comprising performing history based drift compensation using a rate multiplier based on previous differences between the time synchronization signals and the representation of master time.

3. The method of any of examples 1-2 wherein waking from the sleep mode is performed at a time determined from the low frequency clock, and wherein waking from the sleep mode further comprises updating a time of the representation of master time based on the low frequency clock.

4. The method of any of examples 1-3 wherein the received time synchronization signal is based on a master clock that stays operative during the sleep mode of the node.

5. The method of example 4 wherein the node sends a time synchronization signal to another node, and wherein a time provided in the time synchronization signal is based on the representation of master time.

6. The method of example 5 and further comprising:

calculating a clock quality value; and including the clock quality value with the time synchronization signal passed on to other nodes.

7. The method of example 6 and further comprising:

receiving multiple time synchronization signals from different nodes; and selecting a received time synchronization signal to use to update the representation of master time as a function the clock quality values of the received time synchronization signals.

8. The method of any of examples 1-7 wherein the wireless network comprises a battery powered wireless fire system.

9. The method of any of examples 1-8 and further comprising using a TDMA protocol to receive the time synchronization signal in accordance with allocated time slots and wherein the node updates the representation of master time as a function of receive path delay.

10. A computer readable storage device having instructions for causing electronics to perform a method, the method comprising:

running a local low frequency clock in a node in a network during a battery conserving sleep mode;

waking from the sleep mode at a time boundary determined by the low frequency clock;

updating a representation of a master time based on a calculation and the time boundary;

advancing the representation of master time based on a local high frequency clock while the node is awake;

receiving a time synchronization signal from a node in the network; and updating the calculation based on a difference between the representation of master time and a time provided in the time synchronization signal;

setting a new time boundary;

returning to the sleep mode.

11. The computer readable storage device of example 10 wherein the method further comprises performing history based drift compensation using a rate multiplier based on previous differences between the time synchronization signals and the representation of master time.

12. The computer readable storage device of any of examples 10-11 wherein waking from the sleep mode is performed at a time determined from the low frequency clock, and wherein waking from the sleep mode further comprises updating a time of the representation of master time based on the low frequency clock.

13. The computer readable storage device of any of examples 10-12 wherein the received time synchronization signal is based on a master clock that stays operative during the sleep mode of the node.

14. The computer readable storage device of any of examples 10-13 wherein the node sends a time synchronization signal to another node, and wherein a time provided in the time synchronization signal is based on the representation of master time.

15. The computer readable storage device of example 14 and further comprising:

calculating a clock quality value;

including the clock quality value with the time synchronization signal passed on to other nodes;

receiving multiple time synchronization signals from different nodes; and selecting a received time synchronization signal to use to update the representation of master time as a function the clock quality values of the received time synchronization signals.

16. A system comprising:

a local high frequency clock;

a local low frequency clock;

a receiver to receive a time synchronization signal from a node in the network; and a controller coupled to the local high frequency clock, the low frequency clock, and the receiver to wake the system responsive to a time boundary determined by the low frequency clock, update a representation of master time based on a calculation and the time boundary, advance the representation of master time based on the local high frequency clock while the system is awake, receive a time synchronization signal from a node in the network, and update the calculation based on a difference between the representation of master time and a time provided in the time synchronization signal.

17. The system of example 16 wherein the controller is programmed to perform history based drift compensation using a rate multiplier based on previous differences between the time synchronization signals and the representation of master time.

18. The system of any of examples 16-17 wherein waking from the sleep mode is performed at a time determined from the low frequency clock, and wherein waking from the sleep mode further comprises updating a time of the representation of master time based on the low frequency clock.

19. The system of any of examples 16-18 wherein the system sends a time synchronization signal to another node, and wherein a time provided in the time synchronization signal is based on the representation of master time.

20. The system of any of examples 16-19 wherein the controller is further programmed to:

calculate a clock quality value;

include the clock quality value with the time synchronization signal passed on to other nodes;

receive multiple time synchronization signals from different nodes; and select a received time synchronization signal to use to update the representation of master time as a function the clock quality values of the received time synchronization signals.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
running a local low frequency clock in a node in a network during a battery conserving sleep mode;
waking from the sleep mode at a time boundary determined by the low frequency clock;
updating, after waking from the sleep mode, a representation of a master time based on a calculation performed after waking from the sleep mode and the time boundary;
advancing the representation of master time based on a local high frequency clock while the node is awake;
receiving a time synchronization signal from a node in the network;
updating the calculation based on a difference between the representation of master time and a time provided in the time synchronization signal;
setting a new time boundary; and
returning to the sleep mode.

2. The method of claim 1 and further comprising performing history based drift compensation using a rate multiplier based on previous differences between the time synchronization signals and the representation of master time and updating parameters used on the calculation for updating the representation of master time the next time waking from the sleep mode occurs.

3. The method of claim 1 wherein waking from the sleep mode is performed at a time determined from the low frequency clock, and wherein waking from the sleep mode further comprises updating a time of the representation of master time based on the low frequency clock.

4. The method of claim 1 wherein the received time synchronization signal is based on a master clock that stays operative during the sleep mode of the node.

5. The method of claim 1 wherein the node sends a time synchronization signal to another node, and wherein a time provided in the time synchronization signal is based on the representation of master time.

6. The method of claim 5 and further comprising:
calculating a clock quality value; and
including the clock quality value with the time synchronization signal passed on to other nodes.

7. The method of claim 6 and further comprising:
receiving multiple time synchronization signals from different nodes; and
selecting a received time synchronization signal to use to update the representation of master time as a function the clock quality values of the received time synchronization signals.

8. The method of claim 1 wherein the wireless network comprises a battery powered wireless fire system.

9. The method of claim 1 and further comprising using a TDMA protocol to receive the time synchronization signal in accordance with allocated time slots and wherein the node updates the representation of master time as a function of receive path delay.

10. A computer readable storage device having instructions for causing electronics to perform a method, the method comprising:
running a local low frequency clock in anode in a network during a battery conserving sleep mode;
waking from the sleep mode at a time boundary determined by the low frequency clock;
updating, after waking from the sleep mode, a representation of a master time based on a calculation performed after waking from the sleep mode and the time boundary;
advancing the representation of master time based on a local high frequency clock while the node is awake;
receiving a time synchronization signal from a node in the network; and
updating the calculation based on a difference between the representation of master time and a time provided in the time synchronization signal;
setting a new time boundary;
returning to the sleep mode.

11. The computer readable storage device of claim 10 wherein the method further comprises performing history based drift compensation using a rate multiplier based on previous differences between the time synchronization signals and the representation of master time and updating parameters used on the calculation for updating the representation of master time the next time waking from the sleep mode occurs.

12. The computer readable storage device of claim 10 wherein waking from the sleep mode is performed at a time determined from the low frequency clock, and wherein waking from the sleep mode further comprises updating a time of the representation of master time based on the low frequency clock.

13. The computer readable storage device of claim 10 wherein the received time synchronization signal is based on a master clock that stays operative during the sleep mode of the node.

14. The computer readable storage device of claim 10 wherein the node sends a time synchronization signal to another node, and wherein a time provided in the time synchronization signal is based on the representation of master time.

15. The computer readable storage device of claim 14 and further comprising:
calculating a clock quality value;
including the clock quality value with the time synchronization signal passed on to other nodes;
receiving multiple time synchronization signals from different nodes; and
selecting a received time synchronization signal to use to update the representation of master time as a function the clock quality values of the received time synchronization signals.

16. A system comprising:
a local high frequency clock;
a local low frequency clock;
a receiver to receive a time synchronization signal from a node in the network; and
a controller coupled to the local high frequency clock, the low frequency clock, and the receiver to wake the system responsive to a time boundary determined by the low frequency clock, update, after waking from the sleep mode, a representation of master time based on a calculation performed after waking from the sleep mode and the time boundary, advance the representation of master time based on the local high frequency clock while the system is awake, receive a time synchronization signal from a node in the network, and update the calculation based on a difference between the representation of master time and a time provided in the time synchronization signal.

17. The system of claim 16 wherein the controller is programmed to perform history based drift compensation using orate multiplier based on previous differences between the time synchronization signals and the representation of master time and updating parameters used on the calculation for updating the representation of master time the next time waking from the sleep mode occurs.

18. The system of claim 16 wherein waking from the sleep mode is performed at a time determined from the low frequency clock, and wherein waking from the sleep mode further comprises updating a time of the representation of master time based on the low frequency clock.

19. The system of claim 16 wherein the system sends a time synchronization signal to another node, and wherein a time provided in the time synchronization signal is based on the representation of master time.

20. The system of claim 16 wherein the controller is further programmed to:
   calculate a clock quality value;
   include the clock quality value with the time synchronization signal passed on to other nodes;
   receive multiple time synchronization signals from different nodes; and
   select a received time synchronization signal to use to update the representation of master time as a function the clock quality values of the received time synchronization signals.

* * * * *